United States Patent [19]

Luursema

[11] Patent Number: 5,523,656
[45] Date of Patent: Jun. 4, 1996

[54] HIGH PRESSURE DISCHARGE LAMP OPERATING CIRCUIT WITH LIGHT CONTROL DURING LAMP RUN UP

[75] Inventor: Meerten Luursema, Eindhoven, Netherlands

[73] Assignee: U.S. Philips Corporation, New York, N.Y.

[21] Appl. No.: 854,184

[22] Filed: Mar. 20, 1992

[30] Foreign Application Priority Data

Apr. 10, 1991 [EP] European Pat. Off. .............. 91200834

[51] Int. Cl.⁶ .................................................. G05F 1/00
[52] U.S. Cl. ........................... 315/308; 315/158; 315/360; 315/DIG. 7
[58] Field of Search ..................................... 315/151, 158, 315/291, 307, 308, 360, DIG. 5, DIG. 7; 250/205

[56] References Cited

U.S. PATENT DOCUMENTS

| 3,483,428 | 12/1969 | Plante ........................................ 315/151 |
| 4,190,795 | 2/1980 | Schultheis .................................. 323/17 |
| 4,682,084 | 7/1987 | Kuhnel et al. ............................ 315/151 |
| 5,043,635 | 8/1991 | Talbott et al. ............................ 315/291 |

FOREIGN PATENT DOCUMENTS 8600813  4/1986  Netherlands .

Primary Examiner—Robert J. Pascal
Assistant Examiner—Michael B. Shingleton
Attorney, Agent, or Firm—Edward Blocker; Bernard Franzblau

[57] ABSTRACT

A circuit arrangement for operating a high-pressure discharge lamp provided with a ballast circuit VI for generating a current through the high-pressure discharge lamp from a supply voltage. A controller is provided for controlling the power consumed by the high-pressure discharge lamp. The run-up behavior of the high-pressure discharge lamp is governed by an apparatus III for controlling the luminous flux of the high-pressure discharge lamp and by a device IV for the automatic activation of the controller after the run-up of the high-pressure discharge lamp. As a result, the luminous flux of a high-pressure discharge lamp operated by the circuit arrangement has the same, substantially constant value during substantially the entire time duration of the run-up of the high-pressure discharge lamp as during stationary lamp operation.

16 Claims, 2 Drawing Sheets

HIGH PRESSURE DISCHARGE LAMP OPERATING CIRCUIT WITH LIGHT CONTROL DURING LAMP RUN UP

BACKGROUND OF THE INVENTION

This invention relates to a circuit arrangement for operating a high-pressure discharge lamp provided with a ballast circuit VI for supplying a current to the high-pressure discharge lamp from a supply voltage, means I for controlling the power consumed by the high-pressure discharge lamp, and means for influencing the run-up behaviour of the high-pressure discharge lamp.

Such a circuit arrangement is known from Netherlands Patent Application 8600813 laid open to public inspection.

In the known circuit arrangement, the means for influencing the run-up behaviour of the high-pressure discharge lamp, to be called the lamp hereinafter, comprise means for increasing the current through the lamp during the run-up of the lamp. The use of such means has the advantage that the time duration required for the run-up of the lamp can be substantially reduced. This time duration, however, in spite of a comparatively strong current through the lamp during the run-up, is often of the order of 10 seconds, and the luminous flux of the lamp is subject to a comparatively great change during this time. This comparatively great change in the luminous flux during a comparatively long time is felt to be undesirable in many applications.

SUMMARY OF THE INVENTION

An object of the invention is to provide a circuit arrangement by which the luminous flux of a lamp operated by means of this circuit arrangement is controllable at the same substantially constant level as the level at which the luminous flux is maintained during stationary lamp operation, at least during the major portion of the run-up phase of the lamp.

A circuit arrangement according to the invention is for this purpose characterized in that the means for influencing the lamp run-up behavior comprise means III for controlling the luminous flux of the high-pressure discharge lamp, and means IV for the automatic activation of the means I after the run-up of the high-pressure discharge lamp.

During operation of a circuit arrangement according to the invention, the means III are active and the means I are inactive immediately after lamp ignition, and the lamp has a comparatively low luminous efficacy. This comparatively low luminous efficacy is the result of the fact that the temperature of the lamp is considerably lower than the stationary operating temperature. At this considerably lower temperature, the composition of the plasma of the lamp differs from the composition at the stationary operating temperature. During the run-up of the lamp, the temperature of the lamp and the luminous efficacy increase, while the composition of the plasma of the lamp changes. The lamp run-up is completed when the temperature of the lamp, the luminous efficacy and the composition of the plasma of the lamp have become substantially constant. The means III are capable of controlling the luminous flux of the lamp at a substantially constant value during substantially the entire duration of the lamp run-up. Circuit arrangements for operating the lamp, however, are in practice often provided with limitation means for limiting the power consumed by the lamp in order to prevent damage to the lamp and the circuit arrangement. As a result of the operation of these limitation means, which imply a restriction on the operation of the means III, the luminous flux is lower than a desired level during a first comparatively short initial phase of the: run-up phase of the lamp, in which the luminous efficacy of the lamp assumes comparatively low values. After the first comparatively short initial phase of the run-up of the lamp, the means III control the luminous flux of the lamp for the further duration of the run-up at a substantially constant level.

After the run-up of the lamp, the means IV activate the means I, so that no longer the luminous flux of the lamp, but the electric power consumed by the lamp is kept substantially constant. If the means III are calibrated in relation to the means I, the luminous flux of a lamp operated by the circuit arrangement is at the same substantially constant level as during stationary lamp operation after the first comparatively short initial phase of the run-up of the lamp. As a result, the application possibilities of the lamp are considerably increased.

It should be noted that the use of a circuit arrangement by which the luminous flux of the lamp is kept substantially constant both during the run-up and during stationary operation also provides a solution to the set problem. An important disadvantage of the use of such a circuit arrangement, however, is that, if the luminous efficacy of the lamp decreases owing to, for example, ageing, the electric power consumed by the lamp increases also during stationary lamp operation. The life of the lamp is considerably shortened by this.

It should also be noted that U.S. Pat. No. 4,190,795 discloses a circuit arrangement for operating a high-pressure mercury discharge lamp, which circuit arrangement is provided with means for keeping the luminous flux of the high-pressure mercury discharge lamp substantially constant and also with means for keeping the power consumed by the high-pressure mercury discharge lamp substantially constant. The high-pressure mercury discharge lamp operated on said circuit arrangement is meant to be used in photolithographic processes. The means for keeping the power consumed by the high-pressure mercury discharge lamp substantially constant are only meant to keep the high-pressure mercury discharge lamp in an operating condition in which the luminous flux of the high-pressure mercury discharge lamp is comparatively low, when the means for keeping the luminous flux substantially constant are not active, for example, between two successive photolithographic process steps. During a photolithographic process step, the luminous flux of the lamp is comparatively high. In addition, the said circuit arrangement lacks a means for automatic activation of the means for keeping the power consumed by the high-pressure mercury discharge lamp substantially constant after the run-up of the high-pressure mercury discharge lamp. The circuit arrangement described in this Patent is not suitable for controlling the run-up behaviour of a high-pressure discharge lamp for these reasons.

The moment at which the means IV activate the means I in a circuit arrangement according to the invention may, for example, depend on a lamp parameter which changes strongly during the run-up of the lamp, such as, for example, lamp current, lamp voltage, or the temperature at a certain area of the lamp. However, since the time duration of the run-up of each lamp of a certain type and associated power lies within comparatively narrow limits, it is advantageous to provide the means IV with a timer circuit which initiates the activation of the means I by the generation of a signal whenever a fixed time interval has elapsed after lamp ignition. It is possible with such a timer circuit to control the moment at which the means I are activated in a simple and reliable manner.

As was noted above, it is possible through a calibration of the means III in relation to the means I to prevent the luminous flux from being subject to a major change when the means I are activated after the run-up of the lamp. If, however, for example owing to ageing, the luminous efficacy of the lamp changes or a light sensor forming part of the means III becomes polluted and as a result gives a different signal as a measure of this luminous flux, the calibration shows a drift. As a result of this drift, there will be a change in the luminous flux from a first substantially constant level to a second substantially constant level when the means I are activated after the run-up of the lamp. This can be prevented in that the calibration is carried out automatically at regular intervals and in that the result of the calibration is stored in a memory in which this result remains stored also when the lamp is not ignited. It is achieved in this way that, in spite of the ageing of the circuit arrangement and of the lamp operated by the circuit arrangement, the luminous flux of the lamp shows substantially no change when the means I are activated after the run-up of the lamp.

Such a memory may be composed in a simple and reliable manner from a digital memory element, a digital/analog converter, and an analog/digital converter.

BRIEF DESCRIPTION OF THE DRAWING

Embodiments of the invention will be explained in more detail with reference to the accompanying drawing, in which.

DESCRIPTION OF THE PREFERRED EMBODIMENTS

Figure 1:
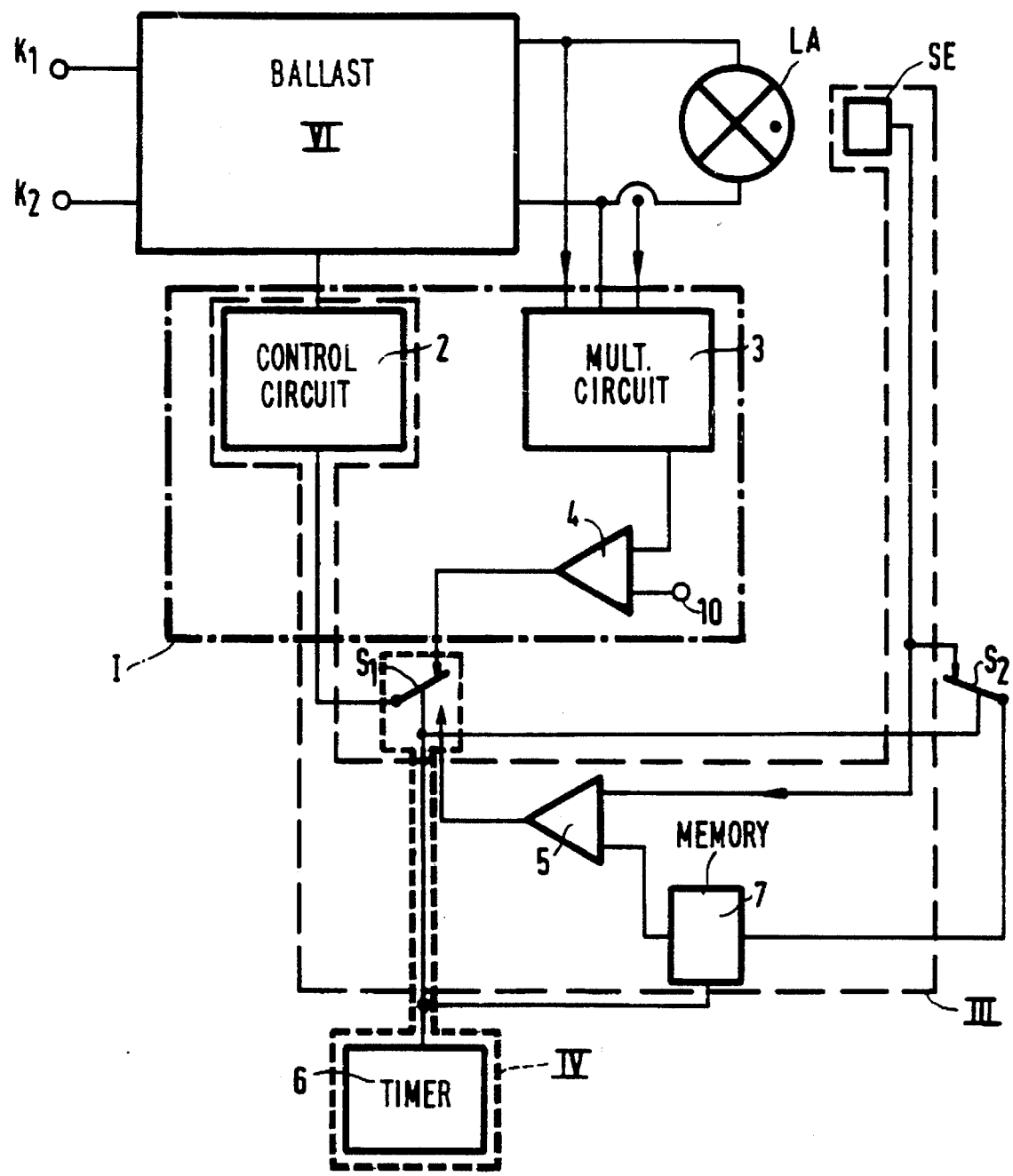
FIG. 1 is a diagram of an embodiment of a circuit arrangement according to the invention.

In FIG. 1, VI denotes a ballast circuit for operating a discharge lamp by means of a current generated from a supply voltage. K1 and K2 are input terminals of the ballast circuit VI for connection to a supply voltage source. A discharge lamp La is coupled to output terminals of the ballast circuit VI. In this embodiment, means I for controlling the power consumed by the discharge lamp are formed by a control circuit 2, a multiplier circuit 3 for generating a signal which is a measure of the power consumed by the lamp, and a differential amplifier 4. Light sensor SE, differential amplifier 5, control circuit 2, and memory 7 together form means III for controlling the luminous flux of the lamp. Timer circuit 6 and switching element S1 form the means IV for automatic activation of the means I after the run-up of the lamp. Timer circuit 6 switching element S2, memory 7, and sensor SE form a calibration means for the automatic calibration of the means III in relation to the means I. Inputs of the multiplier circuit 3 are coupled to the output terminals of the ballast circuit VI. An output of the multiplier circuit 3 is connected to an input of differential amplifier 4. During operation of the circuit arrangement, a further input 10 of differential amplifier 4 is connected to a substantially constant reference voltage which is a measure of a desired value of the power consumed by the lamp. An output of differential amplifier 4 is connected to an input of the control circuit 2 through the switching element S1. An output of control circuit 2 is connected to an input of ballast circuit VI. An output of light sensor SE is connected to an input of differential amplifier 5. The output of light sensor SE is also connected to an input of the memory 7 through the switching element S2. An output of memory 7 is connected to a further input of differential amplifier 5. An output of differential amplifier 5 is connected to the switching dement S1. An output of the timer circuit 6 is connected to a control electrode of switching element S1, to a control electrode of switching element S2, and to a further input of memory 7. Both the switching element S1 and the switching element S2 are either in a first state or in a second state. If switching dement S1 is in the first state, switching element S2 is also in the first state and vice versa. The same is true for the second state. In the first state, switching element S1 connects the output of differential amplifier 5 to the input of control circuit 2, and at the same time breaks the connection between the output of differential amplifier 4 and the input of control circuit 2. In the first state, switching element S2 breaks the connection between the output of light sensor SE and the input of memory 7. In the second state, switching element S1 breaks the connection between the output of differential amplifier 5 and the input of control circuit 2, and connects the output of differential amplifier 4 to the input of control circuit 2. The output of light sensor SE is connected to the input of memory 7 by the switching element S2 when the latter is in the second state.

The operation of the circuit arrangement described is as follows.

When a supply voltage source; is connected to the input terminals K1 and K2, the ballast circuit generates a current by which the lamp La is operated. After the circuit arrangement has been made operational and the lamp has been ignited, the switching elements S1 and S2 are in the first state so that the means III for controlling the luminous flux of the lamp are active since the output of differential amplifier 5 is connected to the input of the control circuit 2. The connection between the output of differential amplifier 4 and the input of control circuit 2 is broken so that the means I are inactive. Immediately after lamp ignition, the luminous flux is lower than the desired value during a first, comparatively short initial phase. To prevent an excessive power consumption by the lamp as a result of this during this first comparatively short initial phase, the circuit arrangement is provided with means, not shown in FIG. 1, for limiting the power consumed by the lamp. At the end of the first, comparatively short initial phase, the luminous flux of the lamp has risen to substantially the desired value. This desired value is determined by the signal present at the output of memory 7, which is a measure of the luminous flux of the lamp during stationary lamp operation. The signal at the output of memory 7 is compared with the signal at the output of the light sensor SE by differential amplifier 5. The signal at the output of differential amplifier 5 drives the control circuit 2. The control circuit 2 controls the power supplied to the lamp La by the ballast circuit in such a way that the luminous flux of the lamp remains constant. It is found in practice that the power supplied to the lamp during the run-up of the lamp decreases continually if the luminous flux remains substantially constant. Depending on the construction of the ballast circuit, the control circuit 2 may control the power supplied to the lamp, for example, by controlling the frequency of the current through the lamp.

A fixed time interval after lamp ignition, the timer circuit 6 switches both the switching element S1 and the switching element S2 to the second state and activates the input of memory 7 through the further input of the memory. The fixed time interval is so chosen that it is at least equal to the time duration required for the run-up of the lamp La in question. The means I are activated in the second state of the switching elements in that the output of differential amplifier 4 is connected to the input of control circuit 2; whereas the means III are rendered inactive in that the connection between the output of differential amplifier 5 and the input of control circuit 2 is broken. A signal which is a measure of the power consumed by the lamp is present at the output of multiplier circuit 3. This signal is compared with the substantially constant reference signal present at the input 10 of the differential amplifier 4. The signal at the output of differential amplifier 4 drives the control circuit 2 in such a way that the power consumed by the lamp is kept substantially constant at a desired value which is dependent on the substantially constant reference signal.

Since switching element S2 is switched to the second state, the output of light sensor SE is connected to the input of memory 7. Since this input is activated by the timer circuit 6 through the further input of memory 7, the instantaneous value of the signal at the output of the light sensor SE is stored in the memory. Since the signal at the output of light sensor SE is a measure of the luminous flux of the lamp during stationary lamp operation, means I being active, the storage of the instantaneous value of the signal applied to the input of memory 7 means that the means III are calibrated in relation to the means I, so that the signal at the output of light sensor SE serves as a calibration signal. When the switching element S2 is in the first state, there is no signal at the input of memory 7 and the input of memory 7 is not yet activated through the further input by timer circuit 6. In this state the input of the memory is passive and the memory holds on to the value last stored. This value last stored is also maintained when the circuit arrangement is not operational. The memory 7 is for this purpose provided with a further supply voltage source, for example, in the form of a battery. The run-up luminous flux of a lamp operated by means of a circuit arrangement as shown in FIG. 1 is substantially equal to the luminous flux during stationary lamp operation independent of ageing or pollution of the lamp or the light sensor.

Figure 2:
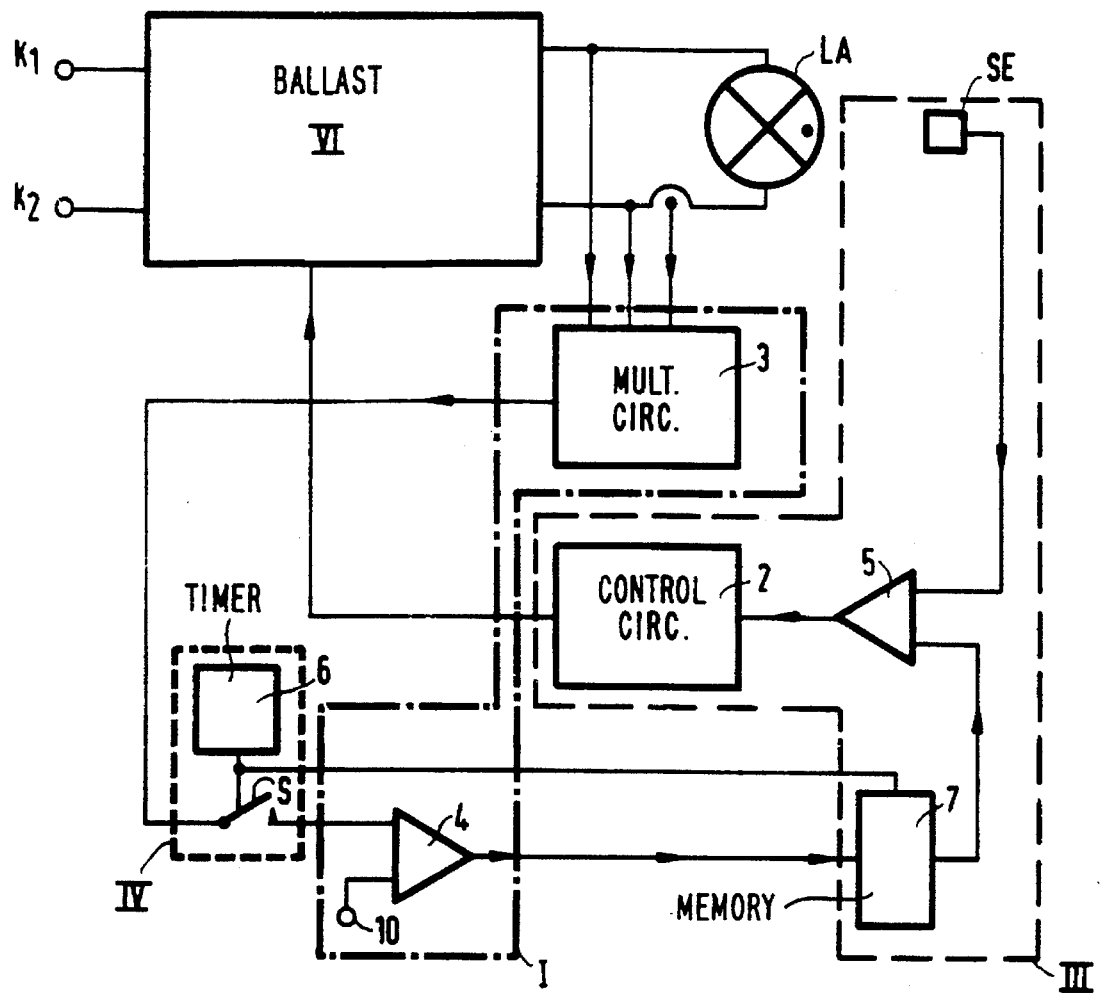
FIG. 2 is a diagram of a further embodiment of a circuit arrangement according to the invention.

In FIG. 2, circuit components corresponding to circuit components of the circuit arrangement shown in FIG. 1 are correspondingly referenced. The circuit arrangement shown in FIG. 2 comprises only one switching element S. Means I for controlling the power consumed by the lamp La are formed by multiplier circuit 3, for generating a signal which is a measure of the power consumed by the lamp, and differential amplifier 4. Memory 7, light sensor SE, differential amplifier 5 and control circuit 2 form the means III for controlling the luminous flux of the lamp. Timer circuit 6, switching dement S, memory 7, differential amplifier 5, and light sensor SE form the calibration means for automatic calibration of the means III in relation to the means I. Means IV for the automatic activation of the means I after the run-up of the lamp are formed by timer circuit 6 and switching element S.

K1 and K2 are input terminals of ballast circuit VI for connection to a supply voltage source. The lamp La is coupled to output terminals of the ballast circuit VI. Inputs of the multiplier circuit 3 are coupled to the output terminals of the ballast circuit VI. An output of the multiplier circuit 3 is connected to the switching element S. An output of timer circuit 6 is connected to a control electrode of switching element S and to a further input of the memory 7. Switching element S is also connected to an input of differential amplifier 4. Switching element S can be in two alternative states: a first state and a second state. In the first state, switching element S breaks the connection between the output of multiplier circuit 3 and the input of differential amplifier 4, while in the second state the switching element S connects the output of multiplier circuit 3 to the input of differential amplifier 4. During operation of the circuit arrangement, a substantially constant reference voltage, which is a measure of a desired value of the power consumed by the lamp, is present at a further input of differential amplifier 4. An output of differential amplifier 4 is connected to an input of memory 7. An output of memory 7 is connected to an input of differential amplifier 5. A further input of differential amplifier 5 is connected to an output of light sensor SE. An output of differential amplifier 5 is connected to an input of control circuit 2, and an output of control circuit 2 is connected to an input of the ballast circuit VI.

The operation of the circuit arrangement described is as follows.

If a supply voltage source is connected to the input terminals K1 and K2, the ballast circuit VI during operation generates a current by which the lamp is operated. Immediately after the circuit arrangement has been made operational and the lamp has ignited, the switching element S is in the first state. As a result, the means I for controlling the power consumed by the lamp are not active, while the means III for controlling the luminous flux of the lamp are active. The luminous flux of the lamp immediately after ignition is lower than the desired value during a comparatively short initial phase. As is also indicated in the description of the operation of the circuit arrangement shown in FIG. 1, the circuit arrangement shown in FIG. 2 is provided with means, not shown, for preventing an excessive lamp power during this comparatively short initial phase. At the end of this comparatively short initial phase, the luminous flux of the lamp has risen to substantially the desired value. This desired value is determined by the signal present at the output of memory 7, which is a measure of the luminous flux of the lamp during stationary lamp operation. If the switching element S is in the first state, no signal is present at the input of memory 7. Memory 7 is then passive and keeps the value last stored. The signal at the output of memory 7 is compared with the signal at the output of the light sensor SE by differential amplifier 5. The signal at the output of differential amplifier 5 drives the control circuit 2. The control circuit 2 controls the power supplied to the lamp La by the ballast circuit in such a way that the luminous flux of the lamp remains constant.

A fixed time interval after lamp ignition, the timer circuit 6 switches the switching element S to the second state and at the same time activates the input of memory 7 through the further input of memory 7. The fixed time interval is chosen to be at least equal to the time duration required for the run-up of the lamp La in question. Both the means I for controlling the power consumed by the lamp and the means III for controlling the luminous flux of the lamp are active now. Since the reference voltage present at input 10 of differential amplifier 4 is substantially constant, while the contents of memory 7 are dependent on the signal at the output of the differential amplifier 4, the means I are predominant over the means III so that the combination of means I and III forms a control mechanism which keeps the power consumed by the lamp substantially constant. The signal at the output of memory 7 is continually adapted to the value of the signal at the output of the light sensor SE while the means I, the means III, and the input of memory 7 are active. This means that a calibration of the means III in relation to the means I takes place continually during stationary lamp operation. This calibration achieves the desired operation, i.e., that the luminous flux of the lamp during the run-up is substantially equal to the luminous flux during stationary lamp operation, also in the case of ageing or pollution of the lamp or the light sensor.

Figure 3:
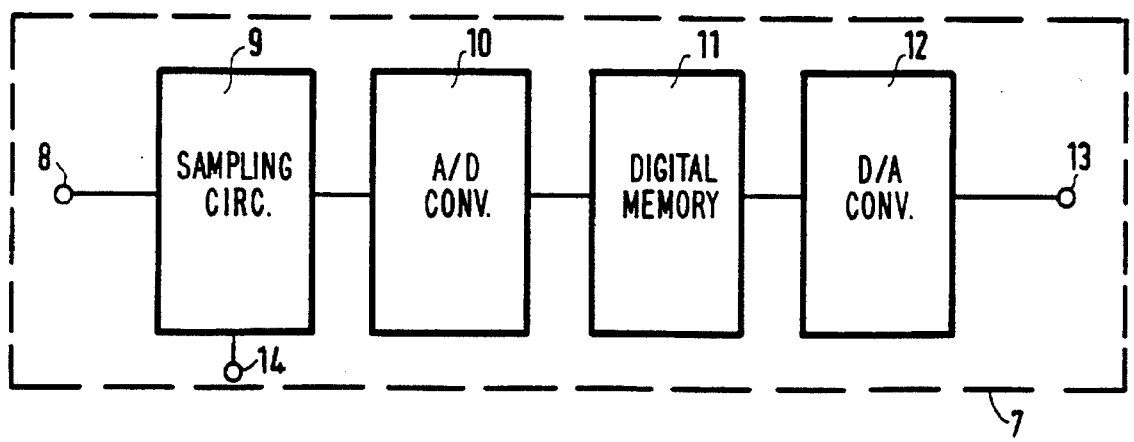
FIG. 3 is a diagram of an embodiment of a memory for use in a circuit arrangement as shown in FIGS. 1 and 2.

In FIG. 3, input terminal 8 of the memory shown is connected to an input of a sampling circuit 9. Reference numeral 14 denotes a further input of sampling circuit 9 for the activation of sampling circuit 9. An output of sampling circuit 9 is connected to an input of an analog/digital converter 10. An output of analog/digital converter 10 is connected to an input of a digital memory element 11. An output of digital memory element 11 is connected to an input of a digital/analog converter 12. An output of digital/analog converter 12 is connected to the output terminal 13 of the memory.

The operation of the memory shown is as follows.

If the memory is active, owing to the fact that the sampling circuit 9 is activated through further input 14, there is a connection between the input 8 and the output terminal of the sampling circuit 9, which connection is broken by the sampling circuit 9 of a sampling frequency f. As a result, the signal at the input of the analog/digital converter is replaced by the instantaneous value of the signal at input terminal 8 with at a frequency f. The signal at the input of the analog/digital converter 10 is converted by the analog/digital converter into a digital signal which is stored in the digital memory element 11. The digital signal is also present at the output of the digital memory element 11 and the input of digital/analog converter 12. The digital signal is converted into an analog signal by the digital/analog converter. The time interval during which the connection between input terminal 8 and the output of sampling circuit 9 is broken is chosen to be greater than the time interval required for digitizing the signal at the input of the analog/digital converter 10, storing it in digital form in the digital memory element 11, and adapting the signal at the output terminal 13. If the memory is passive, there is no connection between the input terminal 8 and the output of sampling circuit 9. In this passive state, the latest value of the digital signal, which was stored in the digital memory element 11 during the active state of the memory, is maintained in this memory element.

I claim:

1. A circuit arrangement for operating a high-pressure discharge lamp comprising:
    a ballast circuit for supplying a current to the high-pressure discharge lamp from a supply voltage,
    means for controlling power consumed by the high-pressure discharge lamp,
    means for influencing a run-up behavior of the high-pressure discharge lamp, characterized in that the influencing means comprise,
    means for controlling the luminous flux of the high-pressure discharge lamp so as to keep the luminous flux substantially constant during a major part of the lamp run-up, and
    means for the automatic activation of the power controlling means after the run-up of the high-pressure discharge lamp.

2. A circuit arrangement for operating a high-pressure discharge lamp comprising:
    a ballast circuit for supplying a current to the high-pressure discharge lamp from a supply voltage,
    means for controlling power consumed by the high-pressure discharge lamp,
    means for influencing a run-up behavior of the high-pressure discharge lamp, characterized in that the influencing means comprise,
    means for controlling the luminous flux of the high-pressure discharge lamp, and
    means for the automatic activation of the power controlling means after the run-up of the high-pressure discharge lamp,
    wherein the automatic activation means comprise a timer circuit for generating a signal which activates the power controlling means a fixed time interval after the ignition of the high-pressure discharge lamp.

3. A circuit arrangement for operating a high-pressure discharge lamp comprising: a ballast circuit for supplying a current to the high-pressure discharge lamp from a supply voltage,
    means for controlling power consumed by the high-pressure discharge lamp,
    means for influencing a run-up behavior of the high-pressure discharge lamp, characterized in that the influencing means comprise,
    means for controlling the luminous flux of the high-pressure discharge lamp, and
    means for the automatic activation of the power controlling means after the run,up of the high-pressure discharge lamp,
    wherein the circuit arrangement further comprises calibration means for automatic calibration of the luminous flux controlling means in relation to the power controlling means, and wherein the luminous flux controlling means comprise a memory for storing a calibration signal which is a measure of the luminous flux of the high-pressure discharge lamp during stable lamp operation.

4. A circuit arrangement as claimed in claim 3, wherein the memory comprises a digital memory element, a digital/analog converter, and an analog/digital converter.

5. A circuit arrangement as claimed in claim 2, wherein the circuit arrangement further comprises calibration means for automatic calibration of the luminous flux controlling means in relation to the power controlling means, and wherein the luminous flux controlling means comprise a memory for storing a calibration signal which is a measure of the luminous flux of the high-pressure discharge lamp during stationary lamp operation.

6. A circuit arrangement as claimed in claim 5, wherein the memory comprises a digital memory element, a digital/analog converter, and an analog/digital converter.

7. A circuit for operating a high-pressure discharge lamp comprising:
    a pair of input terminals for connection to a source of supply voltage for the circuit,
    a ballast circuit coupled between said pair of input terminals and a high pressure discharge lamp to be connected to the circuit,
    a controller coupled to the ballast circuit for controlling lamp power,
    means including at least a part of the controller for controlling the luminous flux of the high-pressure discharge lamp during its run-up phase such that the luminous flux is then substantially equal to the lamp luminous flux present during the normal operation phase of the lamp, and
    means for the automatic activation of the controller at the end of the run-up phase of the high-pressure lamp.

8. A lamp operating circuit as claimed in claim 7 wherein said automatic activation means comprises switching means connected in circuit so as to decouple at least a part of the controller from the ballast circuit while at the same time said luminous flux controlling means is coupled to the controller during the run-up phase and for coupling said part of the controller to the ballast circuit during the normal operation phase of the lamp whereby lamp power-then is regulated to keep the lamp power substantially constant.

9. A lamp operating circuit as claimed in claim 7 wherein the luminous flux controlling means keeps the lamp luminous flux substantially constant during a major part of the lamp run-up phase.

10. A lamp operating circuit as claimed in claim 7 wherein the controller comprises means responsive to lamp current and lamp voltage for deriving a lamp control signal and said activation means comprises switching means for decoupling and coupling said control signal deriving means from and to the ballast circuit during the lamp run-up phase and the normal operation phase, respectively, and wherein during the run-up phase the luminous flux controlling means keeps the lamp luminous flux substantially constant and during the normal operation phase the control signal deriving means controls the lamp power via the ballast circuit so as to keep the lamp luminous flux substantially constant and at the same value it had during the lamp run-up phase.

11. A lamp operating circuit as claimed in claim 7 wherein the controller comprises means responsive to lamp current and lamp voltage for deriving a lamp control signal and said activation means comprises switching means controlled by a timer and which, during the lamp run-up phase, is in a first state in which it couples the luminous flux controlling means to the timer while decoupling said control signal deriving means from the ballast circuit and in the normal operation phase it is in a second state in which it decouples the luminous flux controlling means from the controller while coupling the control signal deriving means to a control circuit of the controller for controlling lamp power via the ballast circuit.

12. A lamp operating circuit as claimed in claim 11 further comprising a light sensor optically coupled only to the discharge lamp, and wherein the luminous flux controlling means includes a memory for storing data received from the light sensor and which is indicative of the lamp luminous flux, wherein in the first state of the switching means the stored data is coupled to the controller where it is used for controlling the lamp luminous flux and in the second state of the switching means the stored data is updated by connecting the memory to the light sensor.

13. A lamp operating circuit as claimed in claim 7 further comprising a light sensor optically coupled only to the discharge lamp, and wherein the luminous flux controlling means includes a memory for storing data received from the light sensor and which is indicative of the lamp luminous flux, and the controller includes a control circuit for the ballast circuit and means responsive to lamp current and lamp voltage for deriving a lamp control signal, and wherein said automatic activation means comprises switching means connected in circuit so as to decouple said lamp control signal deriving means from said memory in a first state of the switching means which corresponds to the lamp run-up phase, said memory and said light sensor then being operative to supply a further control signal to an input of the control circuit of the controller which in turn controls the lamp via the ballast circuit, said switching means having a second state corresponding to the normal operation phase and in which the lamp control signal deriving means is coupled to an input of the memory to update the data stored therein.

14. A lamp operating circuit as claimed in claim 7 further comprising a light sensor responsive to lamp luminous flux, and means for the automatic calibration of the luminous flux controlling means in relation to the controller, said automatic calibration means comprising a memory for storing a calibration signal indicative of the lamp luminous flux present during the normal operation phase of the lamp.

15. A lamp operating circuit as claimed in claim 14 wherein said memory comprises;

an input and an output, and a sampling circuit, an analog/digital converter, a digital memory and a digital/analog converter connected in cascade between said input and output of the memory.

16. A lamp operating circuit as claimed in claim 7 wherein the controller comprises means responsive to lamp current and lamp voltage for deriving a lamp control signal and a control circuit for the ballast circuit, and wherein said automatic activation means comprises a timer circuit and switching means connected in circuit so as to decouple said control signal deriving means from the control circuit during the run-up phase and in response to a signal from the timer circuit.

* * * * *